(12) United States Patent
Schwager et al.

(10) Patent No.: US 7,962,118 B2
(45) Date of Patent: Jun. 14, 2011

(54) METHOD FOR TRANSMITTING A SIGNAL ON A POWER LINE NETWORK, TRANSMITTING UNIT, RECEIVING UNIT AND SYSTEM

(75) Inventors: Andreas Schwager, Kernen (DE); Stephen Tiedemann, Stuttgart (DE); Dietmar Schill, Winnenden (DE)

(73) Assignee: Sony Deutschland GmbH, Berlin (DE)

( * ) Notice: Subject to any disclaimer, the term of this patent is extended or adjusted under 35 U.S.C. 154(b) by 909 days.

(21) Appl. No.: 11/844,681

(22) Filed: Aug. 24, 2007

(65) Prior Publication Data

US 2008/0057866 A1   Mar. 6, 2008

(30) Foreign Application Priority Data

Aug. 24, 2006   (EP) .................................... 06017624

(51) Int. Cl.
    *H04M 9/00* (2006.01)
(52) U.S. Cl. .................................. 455/402; 340/310.11
(58) Field of Classification Search .......................... None
    See application file for complete search history.

(56) References Cited

U.S. PATENT DOCUMENTS

| | | | |
|---|---|---|---|
| 5,257,006 A | 10/1993 | Graham et al. | |
| 6,856,647 B1 | 2/2005 | Evans et al. | |
| 7,801,166 B2* | 9/2010 | Beaucage ..................... | 370/445 |
| 2003/0169155 A1 | 9/2003 | Mollenkopf et al. | |
| 2005/0001694 A1* | 1/2005 | Berkman ..................... | 333/100 |
| 2005/0238107 A1* | 10/2005 | Yamashita et al. ............ | 375/258 |
| 2005/0249236 A1* | 11/2005 | Walden ......................... | 370/465 |
| 2007/0159860 A1* | 7/2007 | Haeberle et al. ................ | 363/44 |
| 2007/0229305 A1* | 10/2007 | Bonicatto et al. ........ | 340/870.03 |
| 2007/0287405 A1* | 12/2007 | Radtke .......................... | 455/402 |
| 2008/0007416 A1* | 1/2008 | Cern ............................. | 340/664 |
| 2009/0140880 A1* | 6/2009 | Flen et al. ................ | 340/870.02 |

FOREIGN PATENT DOCUMENTS

| | | |
|---|---|---|
| DE | 100 26 930 A1 | 12/2001 |
| GB | 2383724 A | 7/2003 |
| GB | 2 407 013 A | 4/2005 |

OTHER PUBLICATIONS

Office Action issued Nov. 8, 2010 in EP Application No. 06 017 624.5 Nov. 8, 2010.
Naofal Al-Dhahir, et al., "Space-Time Processing for Broadband Wireless Access", IEEE Communications Magazine, Sep. 2002, pp. 136-142.
Matthew S. Gast, "A Peek Ahead at 802.11n: MIMO-OFDM", 802.11 Wireless Networks The Definitive Guide, $2^{nd}$ Edition, pp. 311-342, 2005.

(Continued)

*Primary Examiner* — Ajit Patel
(74) *Attorney, Agent, or Firm* — Oblon, Spivak, McClelland, Maier & Neustadt, L.L.P.

(57) ABSTRACT

A method for transmitting a signal on a power line network (3) and a corresponding transmitting unit (T), a receiving unit (R) and a system is presented in order to enhance the coverage and throughput of power line communication systems. It is proposed to provide a plurality of transmission channels, with at least one transmission channel in the power line network (3) (S1), generate at least two auxiliary signals from the signal (S2), transmit said at least two auxiliary signals through at least two of the plurality of channels (S3), receive at least two auxiliary signals through at least two of the plurality of channels (S4) and combine said receive auxiliary signals to obtain said signal (S5).

22 Claims, 9 Drawing Sheets

OTHER PUBLICATIONS

Vahid Tarokh, et al., "Space-Time Block Codes from Orthogonal Designs", IEEE Transactions on Information Theory, vol. 45, No. 5, Jul. 1999, pp. 1456-1467.

David Gesbert, et al., "From Theory to Practice: An Overview of MIMO Space-Time Coded Wireless Systems", IEEE Journal on Selected Areas in Communications, vol. 21, No. 3, Apr. 2003, pp. 281-302.

David Gesbert, et al., "Breaking the barriers of Shannon's capacity: An overview of MIMO wireless systems", Telenor's Journal: Telektronikk, Jan. 2002, pp. 1-9.

* cited by examiner

METHOD FOR TRANSMITTING A SIGNAL ON A POWER LINE NETWORK, TRANSMITTING UNIT, RECEIVING UNIT AND SYSTEM

TECHNICAL FIELD

The invention relates to a method for transmitting a signal on a power line network, to a transmitting unit for transmitting a signal on a power line network, to a receiving unit for receiving a signal on a power line network as well as to a system for transmitting a signal on a power line network.

BACKGROUND

Power line communication (PLC), also called Mains Communication, Power Line Transmission (PLT), Broadband Powerline (BPL), Powerband or Power Line Networking (PLN), is a term describing several different systems for using power distribution wires for simultaneous distribution of data. A carrier can communicate voice and data by superimposing an analog signal over the standard 50 or 60 Hz alternating current (AC). For indoor applications PLC equipment can use household electrical power wiring as a transmission medium. This is a technique used e.g. for in-home automation for remote control of lighting and appliances without installation of additional wiring.

In PLC systems the signals are transmitted and received in a differential mode (DM). Differential mode signaling is a method of transmitting information over pairs of wires. At DM signaling one wire carries the signal and the other wire carries the inverse of the signal, so that the sum of the voltages to ground on the two wires is always assumed to be zero. PLC modems therefore inject a DM signal between a neutral line and a phase line of an outlet of the power line network of the household for communication purposes. Another PLC modem can receive such DM signals at another outlet and use the DM signal for controlling an appliance associated with said receiving PLC modem.

However, at in-house power line grids, there are asymmetric elements between the phase line and the neutral line like a light switch, a current bar in the fuse cabinet, branches, etc. At these asymmetric elements, the DM signals injected by PLC modems are converted to Common Mode (CM) signals, thereby attenuating the DM signal which is added to attenuations due to other attenuation effects for the DM signal and thereby reducing coverage of PLC systems.

It is an object of the present invention to provide a method for transmitting and receiving a signal on a power line network that improves the coverage of PLC systems.

It is further object of the present invention to provide a transmitting unit for improving the coverage of PLC systems.

A still further object of the present invention is to provide a receiving unit for improving the coverage of PLC systems.

A further object of the present invention is to provide a system for improving the coverage of PLC systems.

SUMMARY OF THE INVENTION

The object is achieved in a first aspect by a method for transmitting and receiving a signal on a power line network, comprising:
providing a plurality of transmission channels with at least one transmission channel in said power line network;
generating at least two auxiliary signals from said signal,
transmitting said at least two auxiliary signals through at least two of the plurality of channels;
receiving said at least two auxiliary signals through at least two of the plurality of channels,
combining said received auxiliary signals to obtain said signal.

While applying the method more than one communication channel is used in the power line communication system. With this approach the receiving properties are enhanced either by using the additional channels as back-up or by using the different channels to add diversity to the signals, thereby increasing the reception properties by using diversity in phase, frequency, time or space.

With a second aspect a transmitting unit for transmitting a signal on a power line network is provided, the power line network providing a plurality of transmission channels, comprises:
a signal generator for generating at least two auxiliary signals from said signal;
a connector for connecting said transmitting unit to at least two of said plurality of channels, and
a transmitter for transmitting said at least two auxiliary signals through said at least two channels.

With a third aspect a receiving unit for receiving a signal on a power line network is provided, which comprises:
a connector (53) for connecting said receiving unit (R) to said power line network,
a receiver (54) for receiving at least one auxiliary signals through one channel of said power line network and for receiving at least another auxiliary signal through another channel.
a combiner (55) for combining said at least two auxiliary signals to obtain the original signal.

With a forth aspect a system for transceiving a signal on a power line network is provided, which comprises:
a transmitting unit as afore mentioned and a receiving unit as afore mentioned.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION

Figure 1:
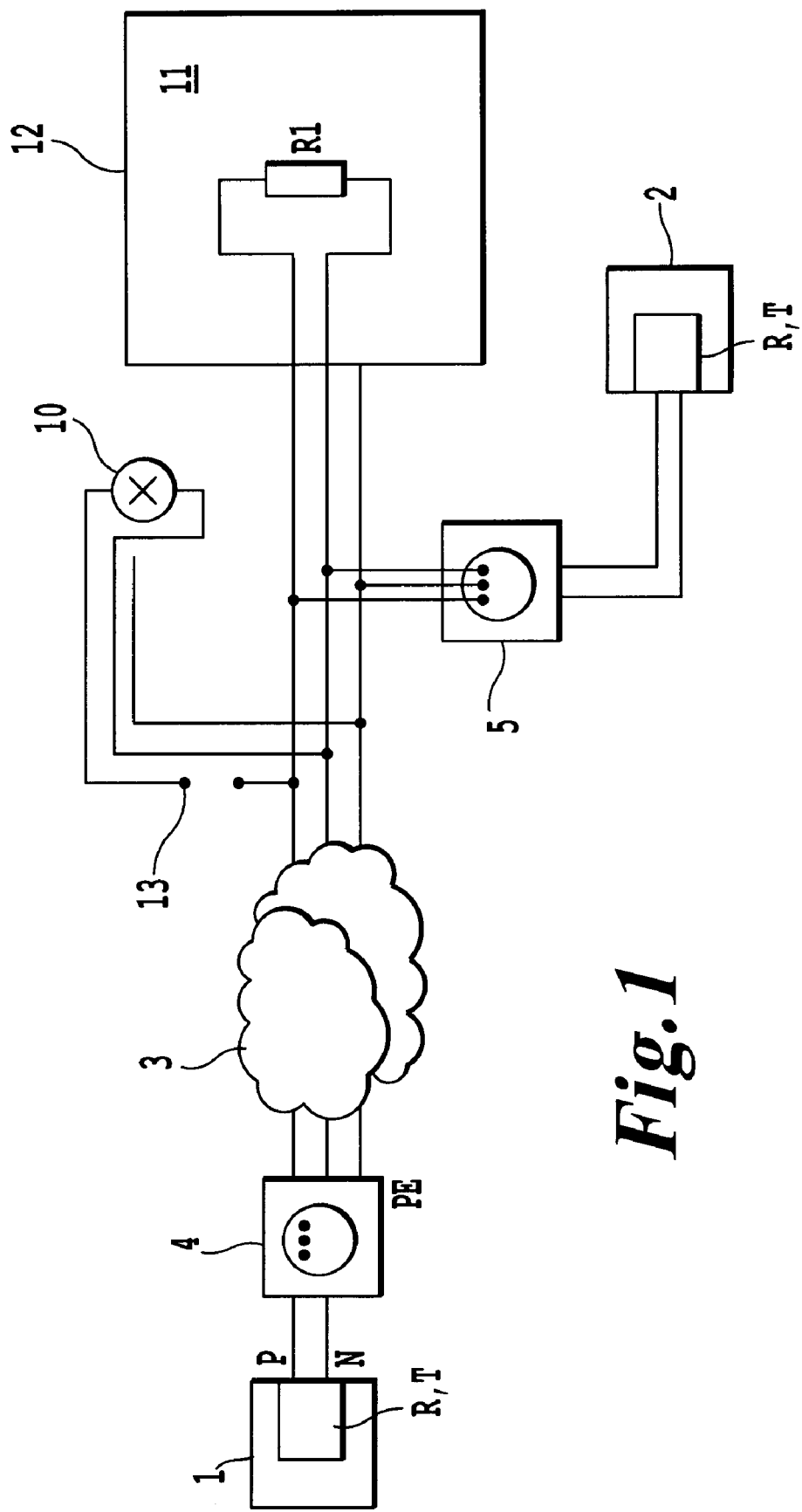
FIG. 1 shows schematically a PLC system as it is used today.

FIG. 1 shows a power line communication system as it is used today. A first conventional PLC-Modem 1 is communicating with a second conventional PLC-modem 2 via a power line network 3 in a building. The first and second conventional PLC modems 1,2 are each connected to a respective first outlet 4 and a second outlet 5 of the power line network 3. The power line network comprises three wires, namely a phase line P, a neutral line N and a protective earth line PE. Power is transmitted to consumers like a light bulb 10 or a consumer unit 11 with a load resistance R via the phase line P and the neutral line N. The protective earth line PE is used for protection purposes in order to protect humans using the power line network by being connected to e.g. housings 12 of the consumer unit 11. The first conventional PLC-modem 1 and the second conventional PLC-modem 2 transmit and receive their data via using the phase line P and the neutral line N. The signals are transmitted and received in a differential mode DM. Differential mode DM signaling causes less radiation from the lines than common mode CM signaling. Mostly the phase line P and the neutral line N are routed in parallel, and sometimes twisted together, so that they show quite a good symmetry. At DM signaling one line carries the signal and the other line carries the inverse of the signal, so that the sum of the voltages on the two lines to ground is always assumed to be zero. At the end of the connection the receiving conventional PLC-modem 1,2 reads the difference between the two signals. Since the receiving conventional PLC-modem 1,2 ignores the lines' voltages with respect to ground, small changes in ground potential between the transmitting conventional PLC-modem 1,2 and the receiving conventional PLC-modem 1,2 do not affect the receiving PLC-modem's ability to detect the signal. Also the system is immune to most types of electrical interference, since any disturbance that lowers the voltage level on one line will also lower it on the other line. This system has a low susceptibility to noise, because distant noise sources tend to add the same amount of voltage (called common-mode noise) to both lines, so the difference between the voltages remains the same. At in-house power line networks, which are nominally balanced, however, there are asymmetric elements between the phase line P and the neutral line N like a light switch 13 or a current bar in a fuse cabinet. At these asymmetric elements, the DM signals injected by the conventional PLC-modems 1,2 are converted into CM signals, thereby attenuating the DM signal, which attenuation is added to attenuations due to other effects, thereby reducing the coverage of PLC networks.

Figure 2:
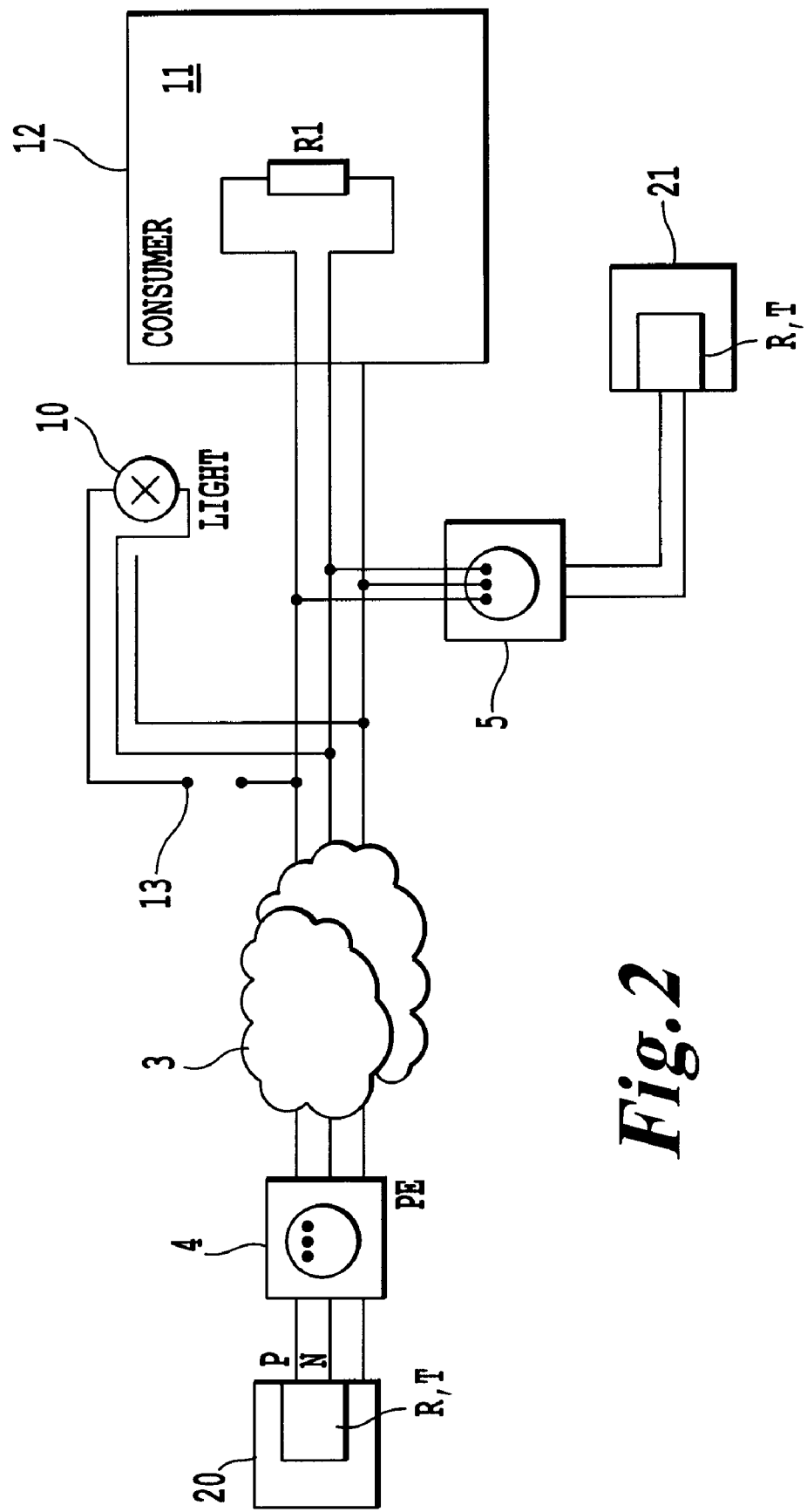
FIG. 2 shows schematically a PLC system with the use of a protective earth.

In FIG. 2 there is shown an embodiment of a PLC communication system with a first diversity PLC-modem 20 and a second diversity PLC-modem 21, whereas the other components are similar to those depicted in FIG. 1, so that the same numerals are used for the same components with the same functions. The first and second diversity PLC-modems 20, 21 are also connected to the protective earth line PE and use the protective earth line PE for communication. The DM signals might be injected by the transmitting diversity PLC-modem between two pairs of the lines, namely two out of the combinations phase-neutral P-N, neutral-protective earth N-PE, phase-protective earth P-PE. The receiving diversity PLC-modem 21 comprises a receiving unit R, which is adapted to receive DM signals from any one of the pairs out of the combination phase-neutral P-N, neutral-protective earth N-PE, phase-protective earth P-PE. While using all three possibilities it is possible to receive signals even in a frequency band, which is attenuated due to frequency dependent fading characteristics in one of the possible transmission channels build by the different line combinations.

Figure 3:
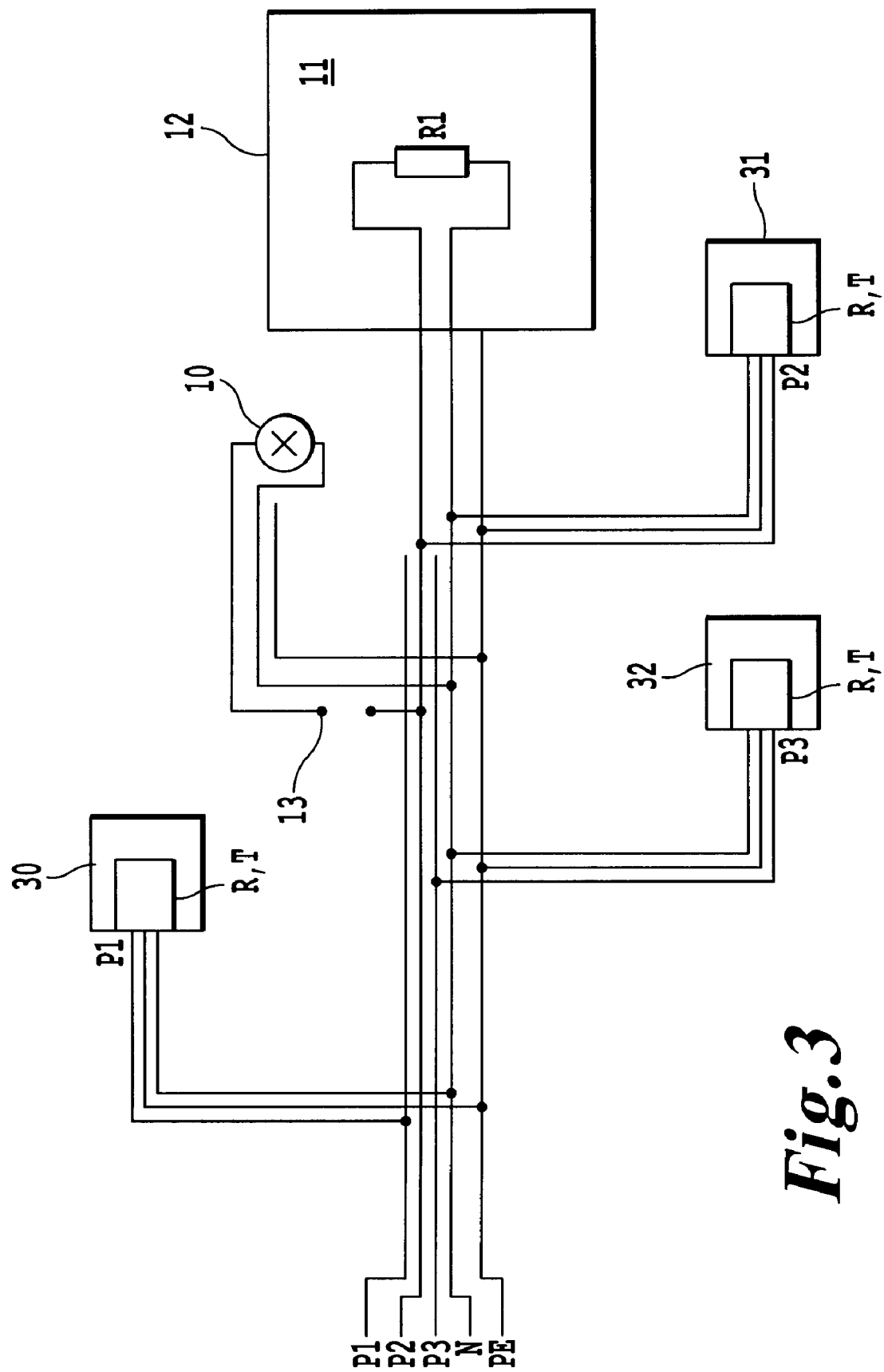
FIG. 3 shows schematically the outline of in-house mains in a standard power line network e.g. in Germany.

FIG. 3 shows an example of an in-house power line network which uses different phase lines P1, P2, P3 for different rooms. In the depicted embodiment, a living room is connected to a first phase line P1, the light bulb 10, the consumer 11 and a bed room 31 are connected to a second phase line P2 and a kitchen 32 is connected to a third phase line P3. The protective earth line PE and the neutral line N is connected to every room 30, 31, 32 and to some consumer units 11. So the neutral line N and the protective earth line PE show high symmetry, whereas the phase lines P1, P2 and P3 are not symmetrical neither between them nor with respect to the neutral line N or to the protective earth line PE. Fuse cabinets with current bars cause further asymmetries.

Figure 4:
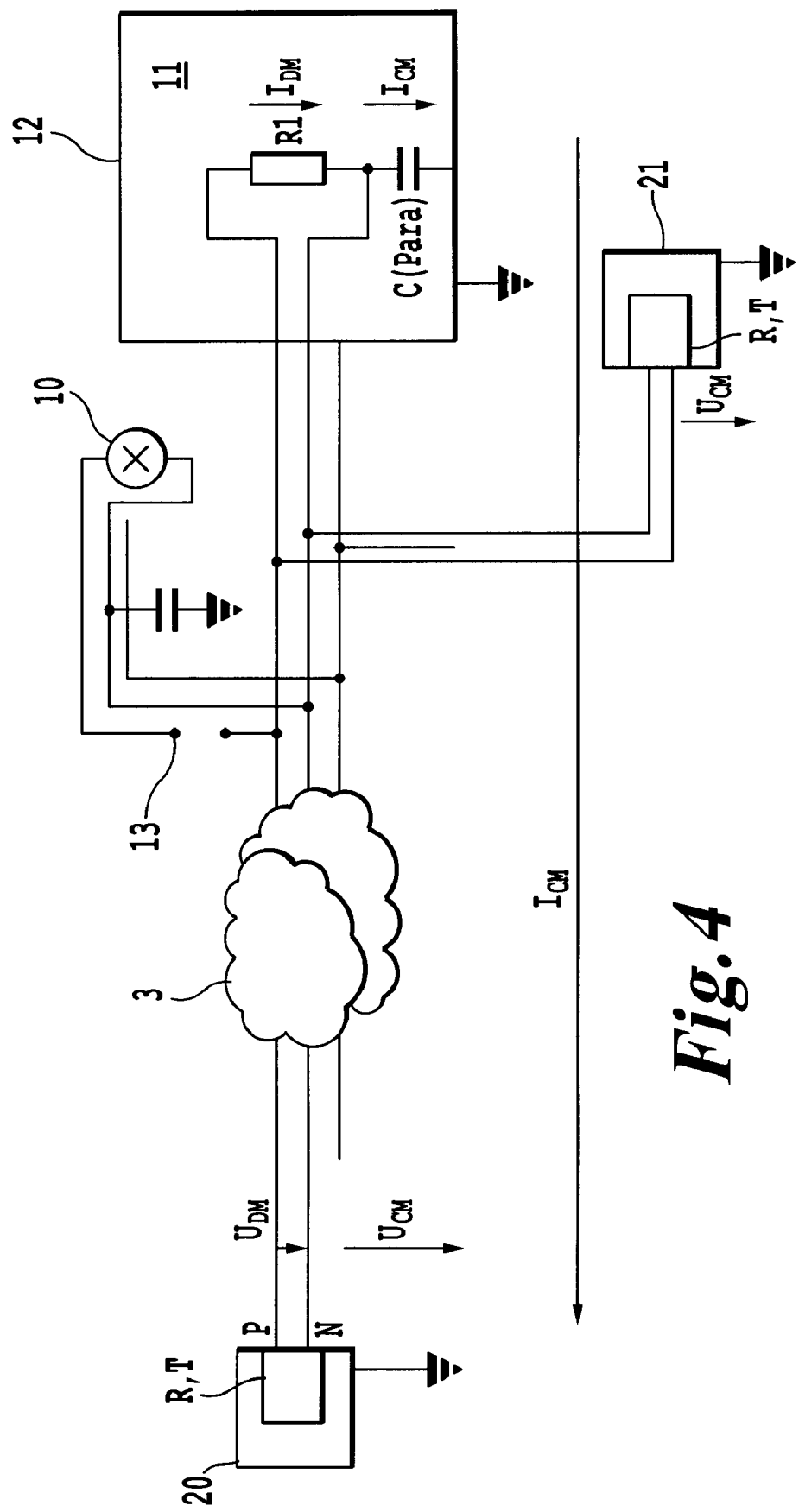
FIG. 4 shows schematically a PLC system with the use of the Common Mode signal.

Another embodiment is shown in FIG. 4. Due to the asymmetry of the power lines CM signals are generated, so that besides the DM signal it is also possible to detect a CM signal, which is obtained automatically by a conversion process at asymmetric elements like fuse cabinets or switches 13, thereby attenuating the DM signal. However, the receiving unit R of the diversity PLC-modem 20, 21 can detect the information of the CM signal thereby adding a further reception channel to the communication system. Especially within devices with large ground planes, like LCD- or Plasma TVs, the additional CM detection can be used.

Figure 5:
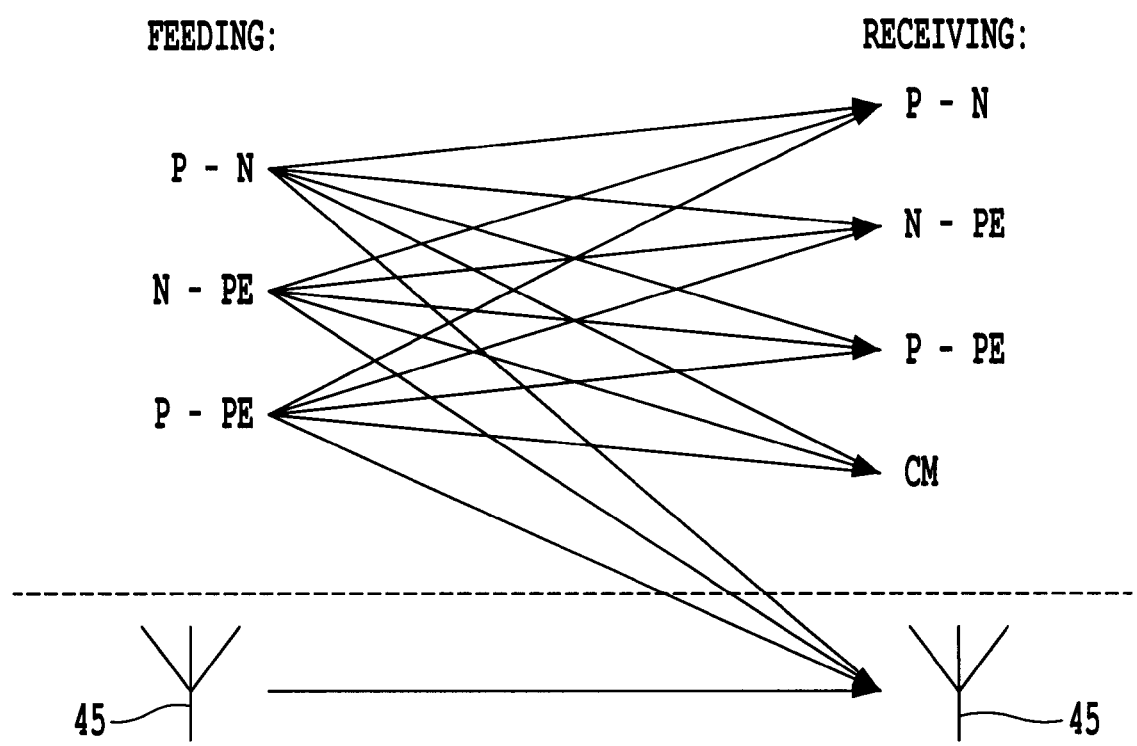
FIG. 5 shows schematically some possibilities for using different channels, provided by injecting signals into different pairs of power lines.

With CM reception the possible links for a communication between diversity PLC-modems are depicted in FIG. 5. Two out of the three feeding possibilities of the signal between phase-neutral P-N, neutral-protective earth N-PE, phase-protective earth P-PE may be used. Four receiving possibilities are obtained, namely DM reception on each of the combinations phase-neutral P-N, neutral-protective earth N-PE, phase-protective earth P-PE, and CM detection. CM voltages are between all wires or the housing 12 of a device and the ground (earth). If there is a huge ground plane, this will be a large capacitor (short-cut for HF signals) to ground. CM signals could be received between all wire and the huge ground plane using a CM coil. Details of receiving CM signals are disclosed in EP application 06010435.3, which contents are enclosed by reference into this application.

If additional lines are present in actual home networks, like e.g. in EIB (European Installation Bus) installations with more lines or in households with different lines used for different pricing schemes by energy supply companies, it is evident that such additional lines might be used in combinations as additional transmitting and reception channels as explained above within the scope of the proposed method.

There are further possibilities for enhancing the number of possible transmission channels thereby enhancing the number of possibilities for feeding and reception. Due to the above-mentioned CM conversion there is also some radiation, caused by the power lines. Such radiation provides the possibility of receiving such wireless signals via an antenna 45, even without transmitting wireless signals initially. Another possibility is the use of a transmitting antenna 45 and a receiving antenna 45, which are, e.g., provided by a wireless network based on the 802.11n standard, which often is available in households for transceiving signals. In such a case the transmitting power line modems have to be connected to a 802.11n transmitting and receiving devices and both transmitting methods have to be correlated.

Figure 6:
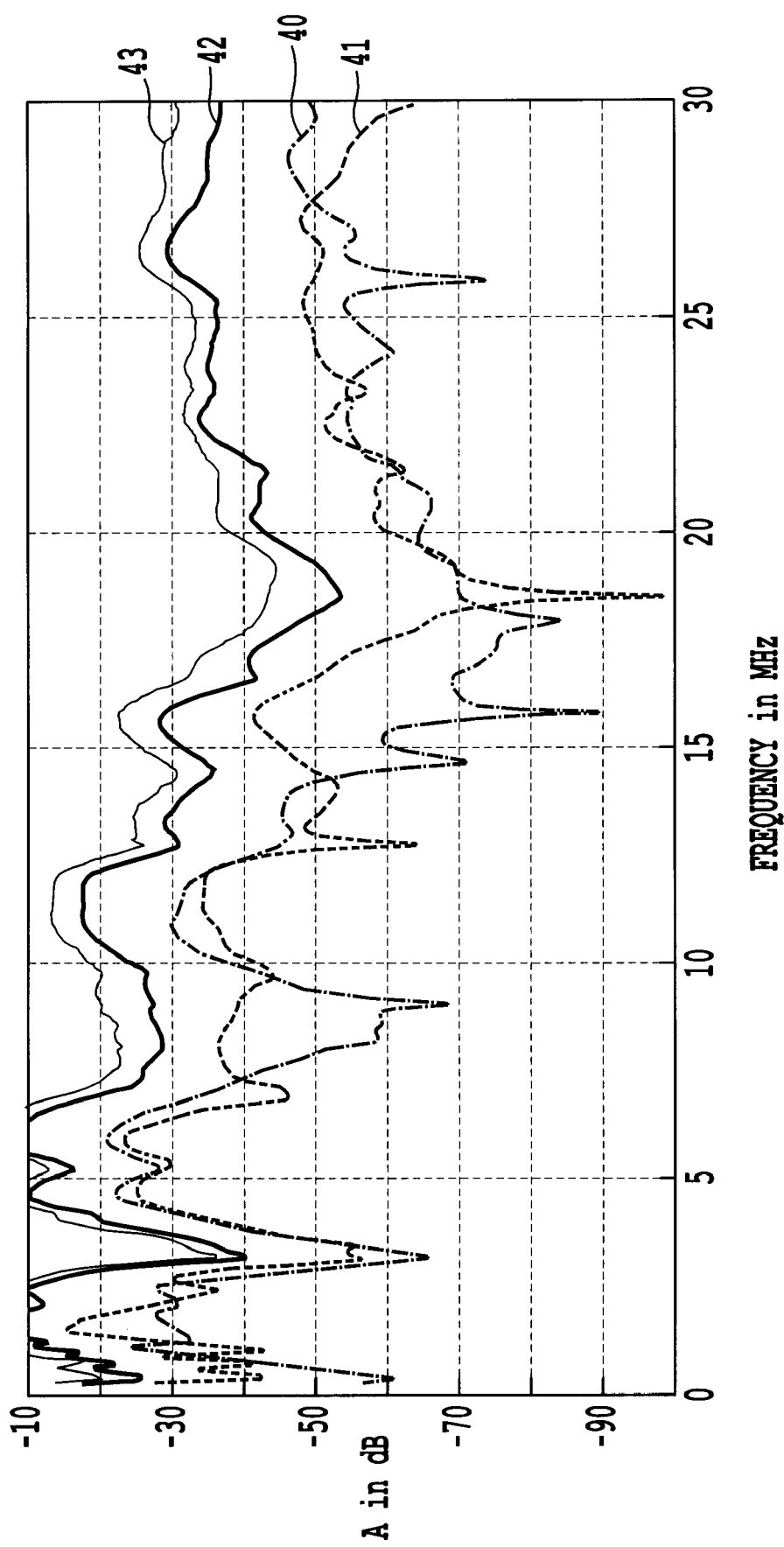
FIG. 6 shows measurement results of the channel attenuation against the transmission frequency for several reception schemes.

In FIG. 6 measurement results of channel attenuation A in a household are depicted as a function of transmission frequency. The curve marked with the reference numeral 40 (dash-dot) is the channel attenuation A for the conventional transmission using DM signals fed and received between the phase line P and the neutral line N. The curve designated by the reference numeral 41 (dashed) shows the channel attenuation A for feeding between phase and protective earth P-PE and receiving between neutral and protective earth N-PE. The curve indicated by reference numeral 42 (dotted) shows the channel attenuation A taking into account the sum of three receiving paths phase-neutral P-N, phase-protective earth P-PE, neutral-protective earth N-PE and of the two best feeding paths; i.e. two out of the three possibilities phase-neutral P-N, neutral-protective earth N-PE, phase-protective earth P-PE for DM signaling. The curve marked by reference numeral 43 (solid) is using the CM receiving paths in addition to the sum curve 42.

It is evident from these measurement results that in different frequency bands there are different fading characteristics present for different transmission channels. The transmission unit T and the receiving unit R of the diversity PLC-modems, which intend to communicate start to evaluate the channel characteristics before the transmission of the signals by transmitting probe signals and/or during the transmission of the signals by measuring the channel properties with the help of the actually transmitted and received signals. With this information the transmitting unit T decides, which feeding channels are best suited for the intended transmission frequency band. The receiving unit R is able to receive signals in every combination of lines and is additionally apt to receive a CM signal, thereby enhancing the coverage of a PLC network. From FIG. 6 it is apparent that while using signal feeding into two channels and receiving on three channels an additional gain of 10-30 dB is achievable in this example, and an additional gain of 3-7 dB might be achieved in this example while additionally using CM reception. Other line geometries in other households might give rise to other values of additional gains.

Similar measurements have been performed in different households, showing similar behavior, however, the fading characteristic has shown a different frequency behavior.

Figure 7:
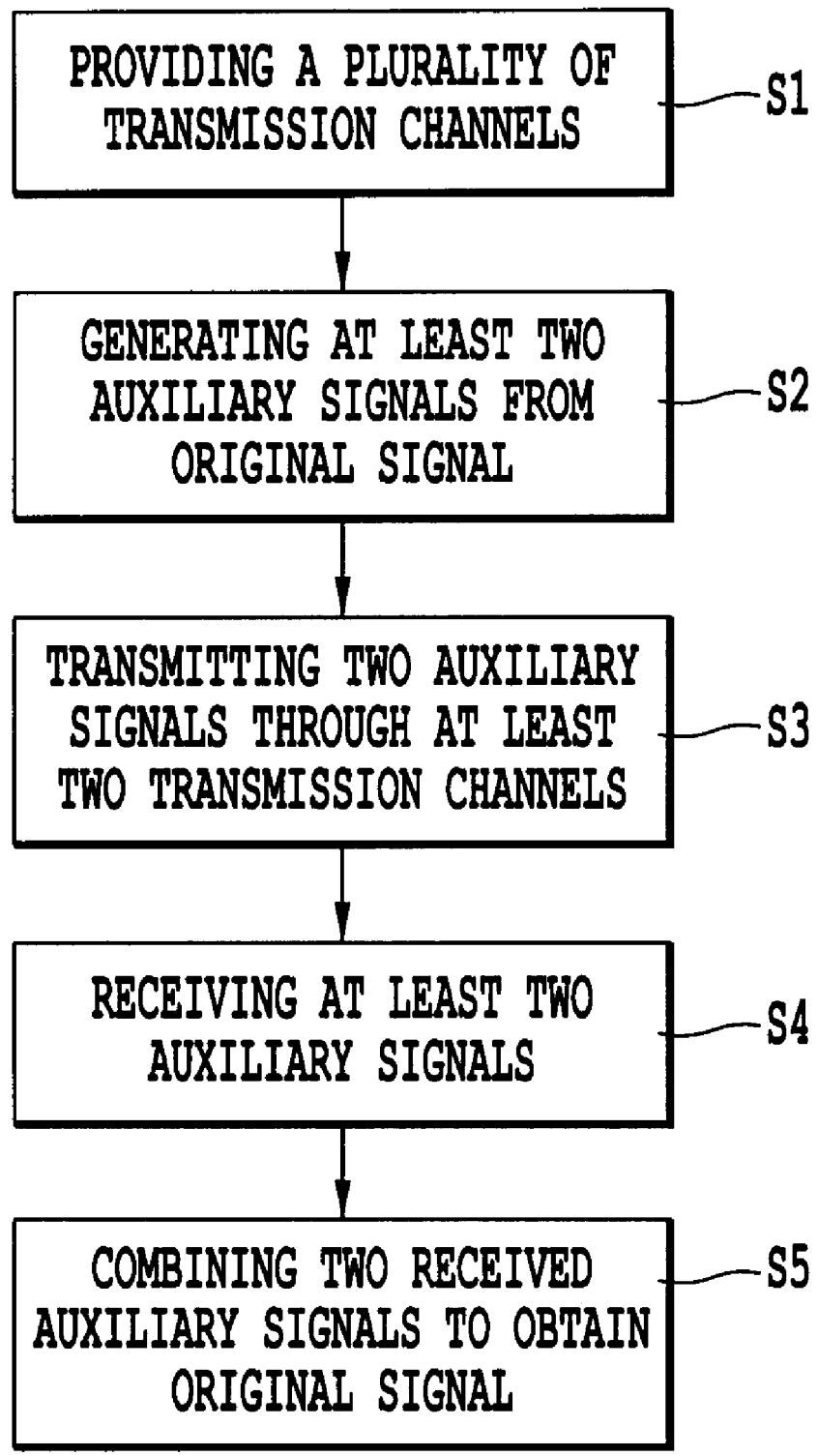
FIG. 7 shows method steps for transmitting and receiving signals on a power line network.

The block diagram of FIG. 7 shows the method steps, which are used: In a first step S1 there is provided a plurality of transmission channels for a power line communication network. This plurality may comprise but is not restricted to different channels in the frequency domain, in the phase domain, in time domain or in space domain. Before transmitting a signal there are generated at least two auxiliary signals from the original signal in a second step S2. These at least two auxiliary signals are transmitted through at least two of the plurality of transmission channels in a third step S3. The receiver receives at least two auxiliary signals in a forth step S4. This reception might be on the same channels as the auxiliary signals are fed, but might be as well on other channels to which signal information has been converted during transmission. The received auxiliary signals are combined to obtain the original signal in a fifth step S5.

Figure 8:
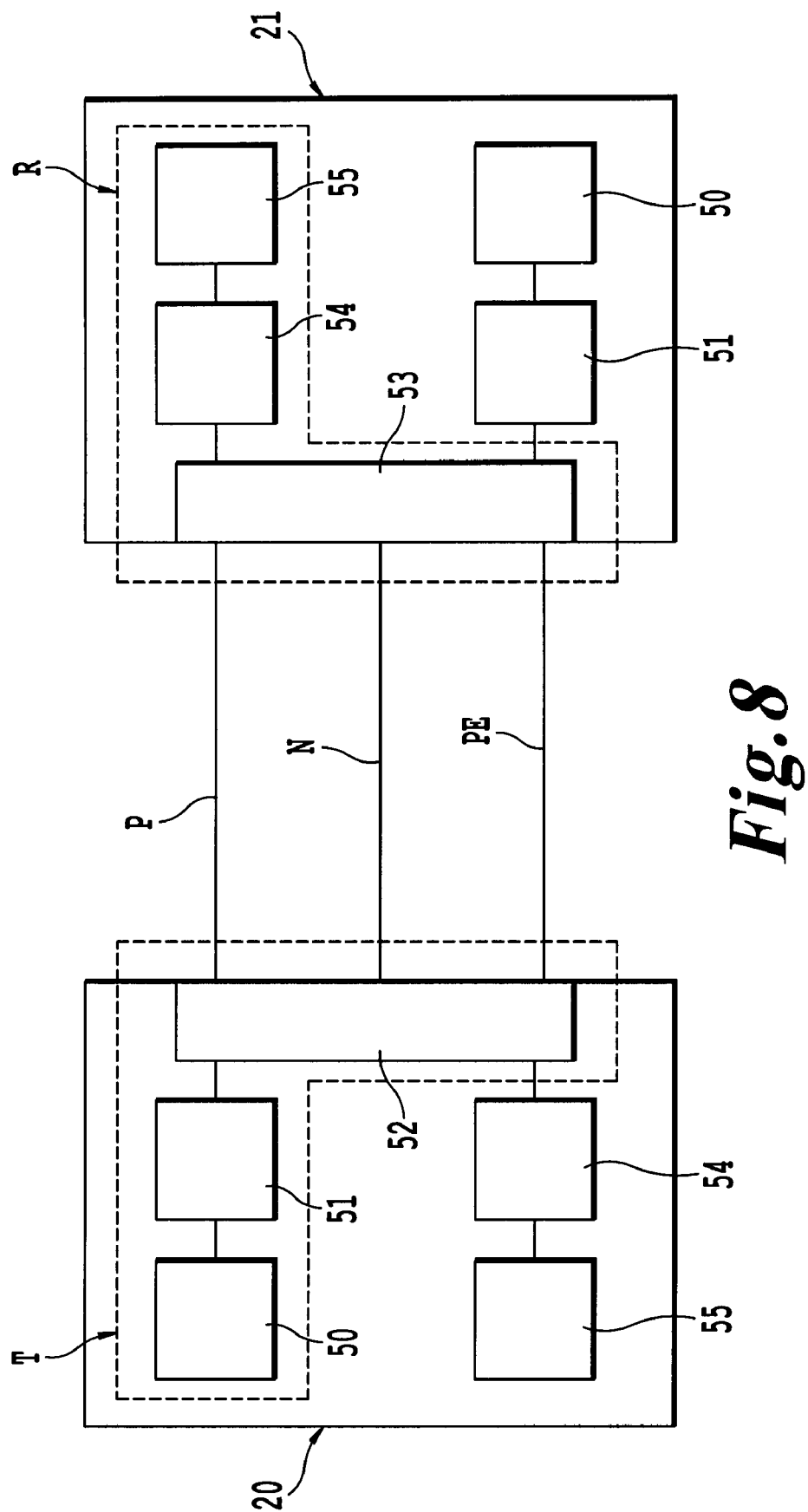
FIG. 8 shows schematically a block diagram of two PLC modems, communicating over a power line network.

FIG. 8 shows a schematic block diagram of an embodiment of a system for transmitting a signal on a power line network. The first diversity PLC-modem 20 and the second PLC-modem 21 each comprise a transmitting unit T and a receiving unit R. The transmitting unit T comprises a signal generator 50 for generating at least two auxiliary signals from an original signal. The signal generator 50 is connected to a transmitter 51, which is connected to a transmitter connector 52, for connecting to the phase line P, the neutral line N and to the protective earth line PE. The receiving unit R comprises a receiver connector 53, a receiver 54 and a combiner 55. The receiver connector 53 connects the receiver 54 to the phase line P, the neutral line N and to the protective earth PE. The received auxiliary signals are transmitted to the combiner 55, which combines the auxiliary signals to obtain the original signal. As depicted in FIG. 10, the receiver connector 53 of a receiving unit R may as well be adapted to act as a transmitter connector when transmitting signals in the other direction, and is therefore connected to the transmitter 51 as well. The same applies correspondingly to the transmitter connector 52.

Figure 9:
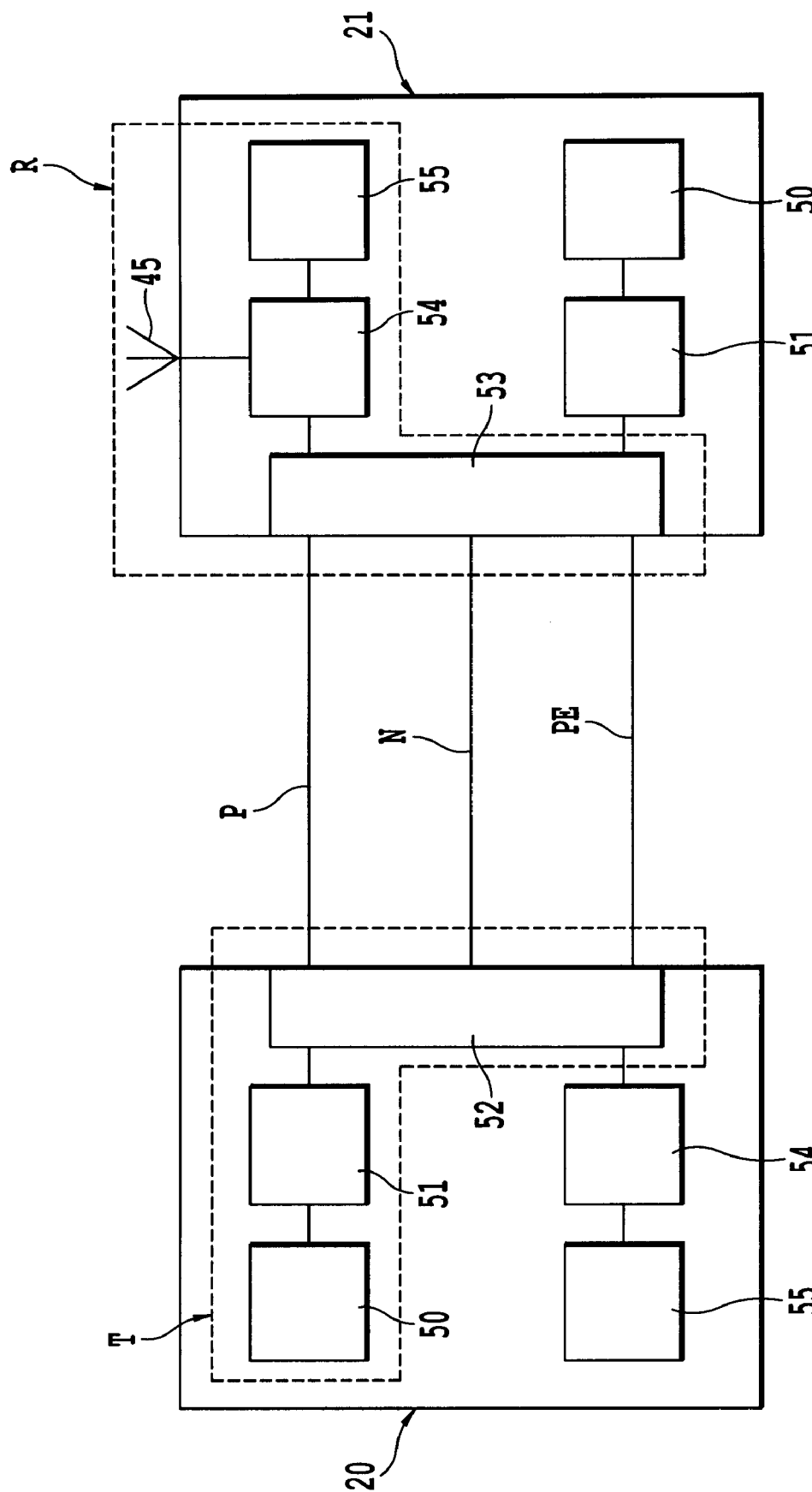
FIG. 9 shows schematically a block diagram of two PLC modems, wherein one of the PLC modems comprises an antenna.

FIG. 9 shows a schematic block diagram of a further embodiment of a system for transmitting a signal on a power line network. In this embodiment the receiving unit R comprises an antenna 45 for receiving wireless signals, which are due to radiation of the power line network. Such additional wireless channel further improves the diversity of the proposed method and system.

By using only transmission channels of the power line network it is possible to use the advantageous features without relying on external networks.

By estimating channel properties of said at least two transmission channels before transmitting the auxiliary signals, determining the transmission channels with the best channel properties and transmitting said auxiliary signals through the transmission channels with the best properties an even enhanced PLC coverage may be achieved. The channel properties may change during time, so that they should be measured again after a predetermined time interval or after a significant change has been measured during an actual transmission, for example. Measurements of the channel properties might include, but are not restricted to bit-error-rate (BER), attenuation, and noise.

For PLC modems the protective earth line of a power line network has not been used so far. The protective earth line, however, is regularly installed and available in most buildings. Accordingly, there are more channels available via a PLC cable, which can be used to transmit signals.

The transmitted auxiliary signals may be received on the same channels as the auxiliary signals were fed. In systems with low attenuation and/or conversion to other modes, this method should result in a good reception quality.

However, there is some couplings between the individual channels, so that part of the signal is also coupled to other channels. In this case, it is possible that a reception of a signal on another channel than the channel initially fed might give a better reception signal, and should therefore be used.

Additionally a CM signal may be detected, since the CM signal path has specific fading characteristics as well. Here the fading depends on the complex DM to CM conversion impedance of the device causing the asymmetrical behavior. A CM signal path provides one more receiving path. In devices with a large ground plane, such as a liquid crystal display (LCD) or plasma Television devices (TV), the additional CM detection can be used.

In one embodiment the transmitter feeds signals between two of the three pairs: phase-neutral, phase-protective earth, neutral-protective earth and the receiver adds all received paths by analog summation, which is a very easy implementation of the diversity method.

Instead of the analog summation, the receiver may convert the analog signals to digital signals and process these digital signals afterwards, thereby using established digital signal processing algorithm to further improve the reception quality.

The method may be used for sending the signal twice through different channels, thereby providing a back-up channel, if one of the channels shows a large fading.

For the transmitter and the receiver more advanced diversity techniques may be used, e.g. multiple input, multiple output MIMO, thereby transmitting different signals over the individual transmission links. In this case the receiver is using a separate channel estimation for each link. As the individual channels are quasistatic, the channel estimation for multiple links is considerably easier as compared to wireless channels. Additionally, the quasi-static behavior allows for the usage of space-time coding.

The channel estimation on the individual links between combinations of phase-neutral, phase-protective earth, neutral-protective earth, CM-path and more paths is effected individually in time domain, one after another so that there is no interference between individual paths.

The presence of the protective earth line in an installation may be detected automatically by PLC modems. By checking the attenuation between a protective earth PE pin and a neutral N pin of a PLC modem the presence of a protective earth PE wire as protective earth line can be detected. If the attenuation between the protective earth PE pin and the neutral N pin is infinite the protective earth PE pin is simply not connected. If attenuation between the protective earth PE pin and the neutral N pin is almost zero, the neutral N pin and the protective earth PE pin are shortcut at the outlet. Any values in between almost zero and infinite indicate the presence of a protective earth PE wire.

Due to the higher symmetry between neutral line and protective earth line, compared to phase line and neutral line, there is less radiation from the power line network. This allows PLC modems to use higher feeding power limits or to save energy or to use less feeding power to avoid any interference to other devices.

The lines of a power line network, for example, may show different behavior due to the following functional or operational scenarios:

The phase line is cut at an open light switch;
The protective earth is left open at many outlets;
If the protective earth is connected to a consumer, usually a huge area of metal is connected, e.g. in the case of a connected kitchen appliance (oven, dish washer, etc.)
In the fuse cabinet every phase line has a current bar and has to cross a fuse.
In three phase line installations, most power consumers are connected to a phase individually.
There are three phase consumers as well as one phase consumers.
The neutral line collects the return current of all three phases in a single line.
Usually all protective earth lines and neutral lines are connected at every branch of the lines in a room.

This behavior was confirmed with measurement of in-home channels. The channels behave widely different and therefore a significant improvement in throughput and coverage can be achieved.

Noise is injected to the phase line and the neutral line, only. There is no noise injected into the protective earth line.

REFERENCE SYMBOLS

1 First conventional PLC-modem
2 Second conventional PLC-modem
3 Power line network
4 First outlet
5 Second outlet
P Phase line
N Neutral line
PE Protective earth line
10 Light bulb
11 Consumer unit
12 Housing
13 Switch
20 First diversity PLC-modem
21 Second diversity PLC-modem
R1 Resistor of Consumer unit
R Receiving unit
T Transmitting unit
P1 First Phase line
P2 Second Phase line
P3 Third phase line
30 Living Room
31 Bed Room
32 Kitchen
40 Curve for feeding and receiving DM signal between phase and neutral line
41 Curve for feeding DM signal between phase and protective earth and receiving
42 Curve for feeding into two best channels and detecting three channels
43 Curve for feeding into two best channels and detecting three channels and Common Mode
45 Antenna
50 Signal generator
51 Transmitter
52 Transmitter connector
53 Receiver connector
54 Receiver
55 Combiner
A Attenuation
S1 First step
S2 Second step
S3 Third step
S4 Forth step
S5 Fifth step

What is claimed is:

1. A method for transmitting a signal on a power line network, comprising:
providing a plurality of transmission channels, with at least one transmission channel in said power line network;
generating at least two auxiliary signals from said signal;
transmitting said at least two auxiliary signals through at least two of the plurality of channels;
receiving said at least two auxiliary signals through at least two of the plurality of channels; and
combining said received auxiliary signals to obtain said signal,
wherein a differential mode signal between two lines of said power line network is used as one of the at least two auxiliary signals, and one of said two lines is a protective earth line.

2. The method according to claim 1, wherein said at least two auxiliary signals are transmitted through at least two transmission channels in said power line network.

3. The method according to claim 1 or 2, further comprising:
estimating channel properties of said at least two transmission channels before transmitting said auxiliary signals;
determining the transmission channels having the best channel properties; and
transmitting said auxiliary signals through the transmission channels with the best properties.

4. The method according to claim 1, further comprising:
providing three channels in said power line network by using each of the combination phase-neutral, phase-protective earth and neutral-protective earth;
transmitting two auxiliary signals by feeding each auxiliary signal on a different channel of said three channels; and
receiving said two auxiliary signals on said different channels of said three channels.

5. The method according to claim 4, further comprising:
receiving a further auxiliary signal on the channel on which no auxiliary signal has been fed.

6. The method according to claim 5, further comprising:
receiving a further auxiliary signal as a common mode signal.

7. The method according to claim 1, further comprising:
combining said auxiliary signals by adding said auxiliary signals by analog summation.

8. The method according to claim 1, further comprising:
combining said auxiliary signals by converting said auxiliary signals in digital auxiliary signals and processing the digital auxiliary signals afterwards in order to obtain the original signal.

9. The method according to claim 1, further comprising:
generating said at least two auxiliary signals so that they have a same shape;
transmitting said at least two auxiliary signals with said same shape at a same time through said at least two channels.

10. The method according to claim 1, further comprising:
transmitting said at least two auxiliary signals at different times through said at least two channels.

11. The method according to claim 1, further comprising:
generating said at least two auxiliary signals with at least one code to obtain said auxiliary signals having a different shape;
combining said auxiliary signals with said at least one code to obtain the original signal.

12. The method according to claim 11, further comprising:
using space-time coding as said code.

13. The method according to claim 1, further comprising:
performing a channel estimation to obtain said channel properties on each channel individually in time-domain, one after another.

14. The method according to claim 1, further comprising:
automatically detecting a presence of said protective earth line.

15. The method according to claim 1, further comprising:
updating said channel properties during transmitting and receiving said auxiliary signals.

16. The method according to claim 1, wherein one of the transmission channels is a wireless channel.

17. A transmitting unit that transmits a signal on a power line network, the power line network providing a plurality of transmission channels, comprising:

a signal generator that generates at least two auxiliary signals from said signal;
a connector that connects said transmitting unit to at least two of said plurality of channels,
wherein said connector is connected to a protective earth line of said power line network; and
a transmitter that transmits said at least two auxiliary signals through said at least two channels,
wherein said transmitter is adapted to transmit a differential mode signal between two lines of said power line network as one of the at least two auxiliary signals over said protective earth line.

18. A receiving unit that receives a signal on a power line network, comprising:
a connector that connects said receiving unit to said power line network;
a receiver that receives at least one auxiliary signals through one channel of said power line network and for receiving at least another auxiliary signal through another channel,
wherein said receiver is adapted to receive a differential mode signal between two lines of said power line network as one of the at least two auxiliary signals over said protective earth line; and
a combiner that combines said at least two auxiliary signals to obtain the original signal.

19. The receiving unit according to claim 18, wherein said another channel is a channel of said power line network.

20. The receiving unit according to claim 18, wherein said another channel is a wireless channel, and
said receiving unit further comprises an antenna to receive said another auxiliary signal through said wireless channel.

21. A system for transceiving a signal on a power line network, comprising:
the transmitting unit according to claim 17, and
a receiving unit.

22. A system for transceiving a signal on a power line network, comprising:
a transmitting unit, and
the receiving unit according to claim 18.

* * * * *